United States Patent
Bulteau (10) Patent No.: US 8,661,176 B2
(45) Date of Patent: Feb. 25, 2014

(54) WIRELESS TWO-WAY TRANSMISSION OF SERIAL DATA SIGNALS BETWEEN AN ELECTRONIC DEVICE AND A POWER METER

(75) Inventor: Serge Bulteau, Julienas (FR)

(73) Assignee: Itron France, Boulogne-Billancourt (FR)

( * ) Notice: Subject to any disclaimer, the term of this patent is extended or adjusted under 35 U.S.C. 154(b) by 65 days.

(21) Appl. No.: 13/260,856

(22) PCT Filed: Mar. 25, 2010

(86) PCT No.: PCT/EP2010/053884
§ 371 (c)(1),
(2), (4) Date: Oct. 25, 2011

(87) PCT Pub. No.: WO2010/118940
PCT Pub. Date: Oct. 21, 2010

(65) Prior Publication Data
US 2012/0047300 A1    Feb. 23, 2012

(30) Foreign Application Priority Data
Apr. 14, 2009 (EP) .................................... 09305314

(51) Int. Cl.
*G06F 13/24* (2006.01)
(52) U.S. Cl.
USPC ........................................... 710/260; 375/258
(58) Field of Classification Search
USPC ................. 375/258; 333/24 C; 713/400–503; 710/260
See application file for complete search history.

(56) References Cited

U.S. PATENT DOCUMENTS 6,603,807 B1    8/2003    Yukutake et al.
7,221,286 B2    5/2007    Gould et al.
(Continued)

FOREIGN PATENT DOCUMENTS

DE    102005051117    4/2007
EP    0 282 102    9/1988
EP    0 977 406    2/2000

OTHER PUBLICATIONS

Machine translation of Abstract of EP 0977406.
(Continued)

*Primary Examiner* — Clifford Knoll
(74) *Attorney, Agent, or Firm* — Hanley, Flight & Zimmerman, LLC (57) ABSTRACT

The invention relates to a bidirectional wireless transmission system for serial format data signals between a "master" electronic device (3) and a "slave" energy meter (2) including a microcontroller (20) having a serial input port ($R_x$). According to the invention, the serial format data signals are exchanged at short range via bidirectional electromagnetic coupling means (4) outputting a pulse on each rising or falling front in said serial format data signals. To transmit data signals from the "master" device (3) to the "slave" meter (2), the pulses at the output of the electromagnetic coupling means (4) are delivered to said serial input port ($R_x$). The microcontroller (20) is programmed so that each pulse received on the input port ($R_x$) generates an interrupt, so as to synchronize the microcontroller on the first received pulse and so as to act at the serial data transmission speed to generate a succession of bits, the value of each generated bit being equal either to the value of the preceding bit if no interrupt has been received in the meanwhile, or else being equal to the inverse of the value of the preceding bit if an interrupt has been received in the meanwhile.

20 Claims, 4 Drawing Sheets

(56) References Cited

U.S. PATENT DOCUMENTS

| | | | |
|---|---|---|---|
| 7,446,672 B2 | 11/2008 | Johnson et al. | |
| 7,493,510 B2* | 2/2009 | Sung et al. | 713/503 |
| 2002/0169570 A1* | 11/2002 | Spanier et al. | 702/61 |
| 2006/0109918 A1* | 5/2006 | Brown | 375/258 |
| 2008/0238582 A1* | 10/2008 | Cordes et al. | 333/24 C |

OTHER PUBLICATIONS

Machine translation of Abstract of DE 102005051117.
International Search Report for PCT International Application No. PCT/EP2010/053884 completed Jun. 15, 2010, mailed Jun. 21, 2010.

* cited by examiner

FIG. 1

Prior art

WIRELESS TWO-WAY TRANSMISSION OF SERIAL DATA SIGNALS BETWEEN AN ELECTRONIC DEVICE AND A POWER METER

PRIORITY CLAIM

This application is a U.S. national phase application of, and claims priority to, PCT International Application No. PCT/EP2010/053884 filed Mar. 25, 2010, which claims benefit of EP Application No. 09305314.8 filed Apr. 14, 2009, all of which are hereby incorporated herein by reference in their entireties for all purposes.

The present invention relates to very short range bidirectional wireless transmission of serial format data signals between two adjacent pieces of electronic equipment.

Attention is given more particularly below to the communication of such serial signals between the electronic circuit of an energy meter, such as a water, gas, or electricity meter and referred below as the "slave" device, and an external "master" electronic device.

The electronic circuit of an energy meter generally includes a microcontroller having a serial link on two of its serial ports, a first port $R_X$ for receiving serial signals and a port $T_X$ for sending serial signals. By means of this serial link, the microcontroller can exchange serial data with other electronic devices.

Such serial data exchanges may be needed at various stages in the life of a meter, and in particular:

- at various stages during production, prior to the various electronic components, including the controller, being enclosed in the sealed housing of the meter;
- at the end of production, after the various electronic components, including the microcontroller, have indeed been enclosed in the sealed housing of the meter;
- when the meter is installed on site so as to enable its parameters to be set; and
- optionally at any time during normal operation of the meter after it has been installed, for example in order to transmit data from the meter to a remote-reader device.

So long as the housing of the meter has not been closed over the electronic components, it is easy to exchange serial signals by electrically connecting test benches to various points of the electronic circuits of the meter. At that stage there is no need to provide any particular connector.

In contrast, once the sealed housing has been closed over the electronic components, it is not possible to open the housing without running the risk of damaging the meter, particularly since with some models of meter the housing is completely filled with a resin for protecting the electronics from severe surrounding conditions, such as immersion of the meter. Under such circumstances, it is likewise not possible to have any electrical contact between the outside of the meter and the serial link of the microcontroller.

Figure 1:
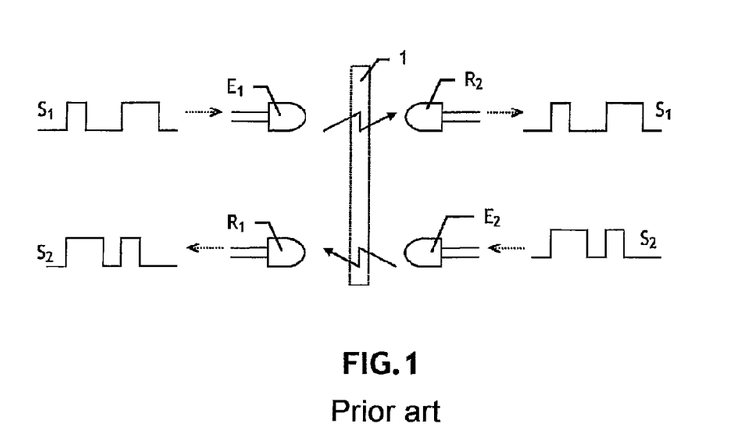
FIG. 1, described above, shows the known principle of exchanging serial type signals via an optical link.

Nevertheless, to enable a "master" external device to communicate with the serial link of the microcontroller ("slave" device) without having recourse to a connector, it is known to make use of bidirectional transmission of serial data via an optical link. The principle of such communication is shown diagrammatically in accompanying FIG. 1: Each of the "master" and "slave" devices has a pair of optical components comprising a light emitter ($E_1$ for the "master" device, $E_2$ for the "slave" device), typically a light-emitting diode (LED), and a light receiver ($R_1$ for the "master" device, $R_2$ for the "slave" device), typically a photodiode or a phototransistor. The "master" external device transmits a first serial signal $S_1$ having two levels that are representative of a succession of "0" or "1" bits, via the light emitter $E_1$, this signal being received by the receiver $R_2$ connected to the serial port of the microcontroller (not shown). Likewise, the "slave" device responds to the "master" device by using its serial send port $T_X$ to transmit a second two-level serial signal $S_2$, likewise representative of a succession of "0" bits or of "1" bits via its emitter $E_2$, this signal being received by the receiver $R_1$ of the "master" device.

The advantage of such optical data exchange is that the serial data signals $S_1$ and $S_2$ are transmitted without change and there is no need for any transformation on reception. When the serial port $R_X$ of the microcontroller of the "slave" device receives a serial data signal $S_1$, the microcontroller is programmed so that receiving the first front of the start bit generates an interrupt, thereby enabling the microcontroller to synchronize itself and then launch a routine acting at the known speed of the received train of bits to read the state of each bit following the start bit in the middle of said bit, thereby recovering the data transmitted thereto. The major drawback nevertheless lies in the fact that it is necessary to provide a wall 1 on the meter housing that is transparent, at least at the light wavelength used. Since the entire housing of a meter cannot be transparent, that requires a transparent wall to be provided locally, thereby running the risk of harming the sealing of the housing. In addition, the meter needs to include a light emitter and a light receiver, thereby increasing the cost of producing it. This extra cost is particularly undesirable when the communication of such serial signals is used only during stages of production and installing the meter.

Document DE 10 2005 051 117 A1 also discloses a communications interface between a meter and an evaluation module in which signal exchange takes place by capacitive coupling between capacitive electrodes situated on respective walls of the meter and of the module. The clear advantage of such an interface is that signal transmission can take place through the plastics material housing and through the resin. In contrast, capacitive coupling allows only signal variations to be transmitted and does not transmit constant levels. This is of no consequence in the context of document DE 10 2005 051 117 A1 which provides for the transmission of signals generated using the IrDA protocol, i.e. signals that are in the form of a succession of pulses of very short durations.

Nevertheless, such an interface is not suitable for communicating serial signals since it is necessary on reception to reconstruct the serial signal from the signal variations that are received by capacitive coupling.

Finally, wireless data exchange solutions are known between a meter and a measurement appliance that make use of inductive coupling. Just like the above-described capacitive coupling, data exchange by inductive coupling enables only signal variations to be transmitted. If the signals that are to be exchanged are in serial format, e.g. in the RS232 standard format, then it is necessary to provide means on reception for reconstructing the constant levels of the signals from the signal variations.

A system for bidirectional transmission of serial signals in accordance with the precharacterizing portion of claim 1 is described in document EP 0 977 406, for example.

An object of the present invention is to propose a solution for exchanging serial data between an energy meter and a "master" electronic device that makes use of electromagnetic coupling of the capacitive or the inductive type without harming the cost of the energy meter, i.e. without requiring recourse to expensive additional components for reconstructing the serial signals.

According to the invention, this object is achieved by a bidirectional wireless transmission system for serial format data signals as defined in claim 1.

The "master" electronic device preferably includes an interface interposed between serial format data signal send/receive means and said electromagnetic coupling means. To transmit data signals from the "master" electronic device to the "slave" energy meter, said interface comprises a high-voltage pulse generator receiving the serial format data signals sent by the send/receive means and outputting a high-voltage pulse on each rising or falling front in the received serial format data signals.

To transmit data signals from the "slave" energy meter to the "master" electronic device, the serial format data signal for transmission is delivered by the output port of the microcontroller to the electromagnetic coupling means, and said interface preferably comprises a serial signal generator having its input connected to the output of the coupling means and having its output deliver serial format data signals to said send/receive means.

The electromagnetic coupling means may be of the inductive type. Under such circumstances, the electromagnetic coupling preferably comprises two coils placed on either side of a plastics wall of the meter housing so as to constitute an electrical transformer.

As a variant, the electromagnetic coupling means may be of the capacitive type. Under such circumstances, they preferably comprise four conductive plates placed on either side of a plastics wall of the housing of the meter so as to act in pairs to form transmission capacitors.

The present invention can be better understood in the light of the following description made with reference to the accompanying figures, in which.

Figure 2:
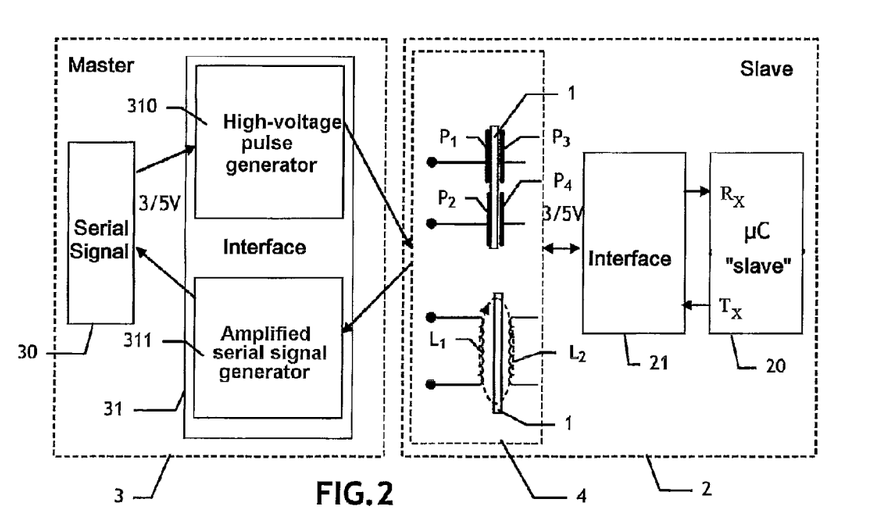
FIG. 2, in the form of a simplified block diagram, shows the principle of the invention for exchanging serial data by electromagnetic coupling between a "master" device and a "slave" energy meter including a microcontroller.

FIG. 2 is in the form of a simplified block diagram and it shows the components needed for bidirectional serial data communication between a "slave" device 2 constituted by an energy meter including a microcontroller 20, and a "master" electronic device 3, such as a test appliance. It is recalled that the signals that are to be exchanged between the "master" device 3 and the "slave" device 2 are serial type signals, e.g. asynchronous signals in the RS232 standard format. Such serial signals have two constant levels (typically 0/5 volts or 0/3 volts for battery-powered devices) and they represent a succession of "0" or "1" bits.

The bidirectional data transmission takes place by electromagnetic coupling of the capacitive or inductive type. This electromagnetic coupling is represented diagrammatically by dashed-line rectangle 4 in FIG. 2.

Two interfaces for performing functions that are explained below are also provided, a first interface 31 for the "master" device and a second interface 21 for the "slave" meter, upstream from the microcontroller 20 in the receive direction.

Figure 3:
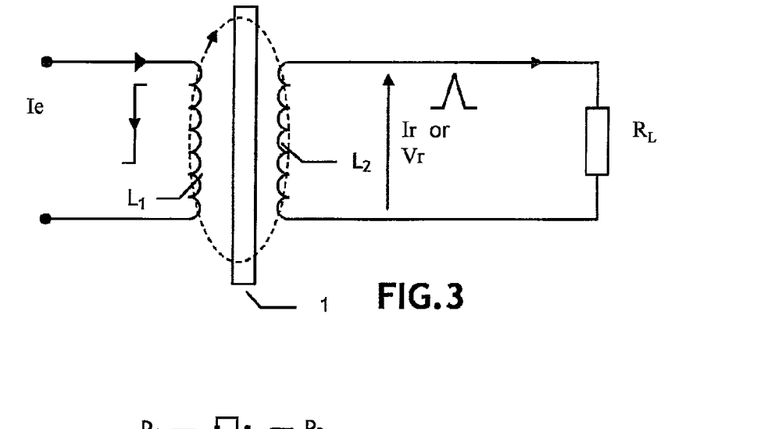
FIG. 3 shows the equivalent electrical circuit diagram for transmission by inductive coupling.

With inductive type electromagnetic coupling, two coils $L_1$ and $L_2$ are placed on either side of the plastics wall 1 of the housing of the meter. These two coils constitute an electrical transformer. The equivalent circuit diagram is given in FIG. 3. If a current front $I_e$ is sent through the coil $L_1$, a current pulse $I_r$ (with low load impedance $R_L$) or a voltage pulse $V_r$ (with high load impedance $R_L$) is received by the coil $L_2$. Transmission is bidirectional and the pulse levels are asymmetrical, thereby making it possible to reduce costs for the meter. It should be observed that the coupling factor in such transmission is very low such that it is preferable to provide a function of amplifying the transmitted signals.

Figure 4:
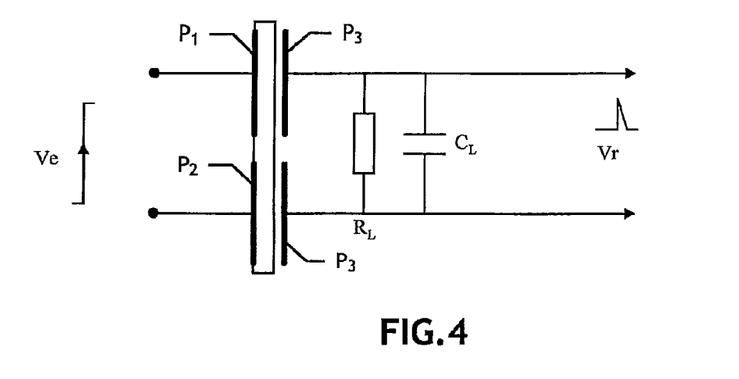
FIG. 4 shows the equivalent electrical circuit diagram for transmission by capacitive coupling.

With capacitive type electromagnetic coupling, four conductive plates $P_1$ to $P_4$ are placed on either side of the plastics wall 1 of the housing of the meter so that in pairs they form transmission capacitors. The equivalent circuit diagram is given in FIG. 4. If a voltage front $V_e$ is sent between the two plates $P_1$ and $P_2$, then a voltage pulse $V_r$ will be received between the plates $P_3$ and $P_4$, with the duration of the pulse depending on the time constant $R_L \times C_L$ where $R_L$ is the load impedance and $C_L$ is the load stray capacitance. Transmission is likewise bidirectional and the levels of the pulses are asymmetrical, thereby enabling costs to be reduced for the meter. From the circuit diagram of FIG. 4, it can be seen that the conductive plates cooperate with the load stray capacitance to form a voltage divider such that the amplitude of the received signal is lower than the amplitude of the sent signal in the ratio:

$$V_r/V_e = C_T/C_L$$

Given the orders of magnitude of the capacitances (in the range 0.3 picofarads (pF) to 1 pF for $C_T$ and 10 pF to 20 pF for $C_L$), the amplitude of the received signal may thus be one-twentieth to one-fortieth the amplitude of the signal as sent. It is thus likewise necessary to provide a signal amplification function.

Thus, regardless of the type of electromagnetic transmission that is selected, only the rising and falling fronts in the serial signal for transmission are in fact transmitted and received in the form of pulses, and it is necessary to be able to reconstruct the serial type signals from the received pulses. In addition, with both kinds of transmission, it is necessary to provide level amplification for the transmitted signals.

To simplify the second interface 21 as much as possible, the invention provides for the signal amplification functions to be performed not by the interface 21 of the meter, but by the interface 31 of the "master" device.

More particularly, the first interface 31 of the "master" device comprises:
  a high-voltage pulse generator 310 receiving the serial data signal sent by the send/receive means 30 of the "master" device and delivering an impulse of amplified level on each front in the serial data signal; and amplification means 311 receiving pulses transmitted by the electromagnetic coupling 4 and resulting from a serial data signal being sent by the "slave" meter, and reconstructing the corresponding serial data signal in order to deliver it to the serial format send/receive means 30.

Figure 5:
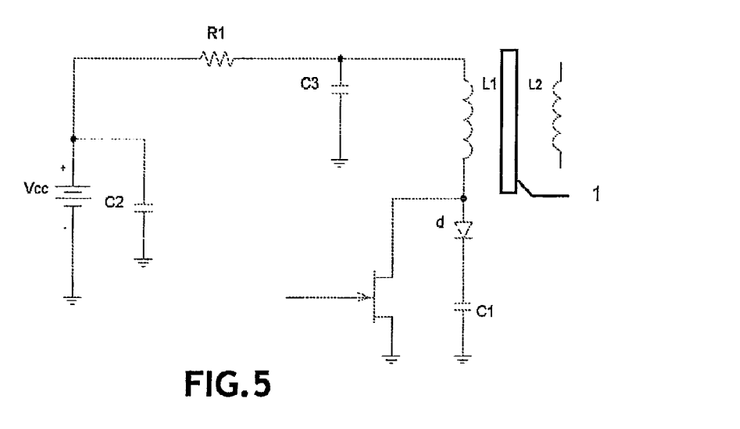
FIG. 5 shows a preferred embodiment of a high voltage generator of the "master" device for transmission by inductive coupling.
Figure 6:
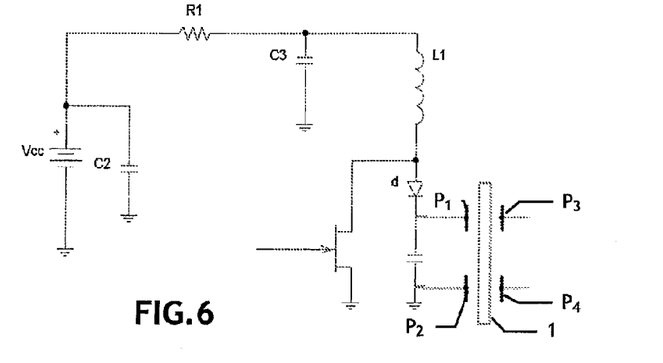
FIG. 6 shows a preferred embodiment of a high voltage generator of the "master" device for transmission by capacitive coupling.

FIGS. 5 and 6 show preferred embodiments of the high-voltage pulse generator 310 respectively for transmission by inductive coupling and for transmission by capacitive coupling. Pulse generation is performed using the known principle of charging a coil $L_1$ until a determined current is obtained and then discharging the coil, the charge and discharge cycles being controlled by a transistor. It should be observed that with transmission by inductive coupling, it is the coil $L_1$ that is used directly in the generator 310.

The interface means 311 may be embodied by a conventional operational amplifier circuit serving to reconstruct a serial signal from amplified pulses. The logic applied corresponds to that of a D-type bistable, which changes state each time it receives a pulse.

As mentioned above, the function of reconstructing a serial signal from the "master" device to the "slave" device must not harm the cost of the meter. To achieve this, the invention provides for reconstructing these signals by means of a particular software routine in the microcontroller 20, which microcontroller receives the pulses as transmitted by the magnetic coupling via a serial port $R_X$.

The particular software routine consists in performing the following steps:
the microcontroller 20 generates an interrupt on each received pulse, corresponding to each rising or falling front in the serial data signal as sent;
the microcontroller 20 synchronizes itself on the first received pulse corresponding to the rising front of the start bit of the serial data signal as sent, and operates at the serial data transmission speed to generate a succession of bits, each generated bit having:
  a value equal to the value of the preceding bit if no interrupt has been received in the meantime; and
  a value equal to the inverse of the value of the preceding bit if an interrupt has been received in the meantime.

Figure 7:
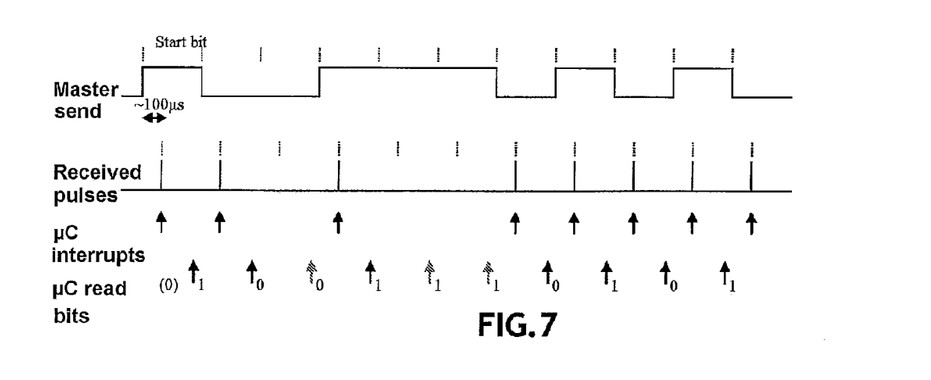
FIG. 7 shows an example of signals sent and received respectively by the "master" device and by the microcontroller of the "slave" meter, and the processing performed by the microcontroller.

An example of how a succession of bits is generated by the microcontroller is shown in FIG. 7. In this figure, the first timing charge shows the appearance of a serial data signal as sent by the "master" device upstream from the interface 31. This serial data signal is made up of a succession of bits, the beginning of the signal being identified by a start bit of value 1. In the example, the signal has the form "10011101010".

The second timing chart shows the appearance of the high-voltage pulses generated by the high voltage generator 310, these pulses corresponding to each rising or falling front in the serial data signal as sent by the "master" device. Given the processing time required by the generator 310, these pulses are slightly offset in time (with a delay of about 100 microseconds (µs)) relative to the rising and falling fronts of the signal as sent. These pulses are transmitted as such by capacitive or inductive electromagnetic coupling. The third timing chart shows the interrupts generated by the microcontroller 20 of the meter on each pulse received as input to the serial port $R_X$. The last timing chart shows the succession of bits generated by the microprocessor in application of the above-specified rules. The signal "1001110101" as originally sent is indeed retrieved.

Figure 8:
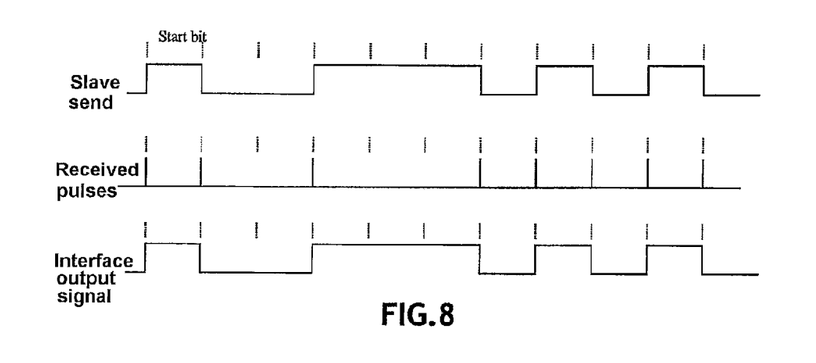
FIG. 8 shows an example of signals sent and received respectively by the microcontroller of the "slave" meter and by the "master" device, and of the processing performed by the interface of the "master" device.

FIG. 8 shows an example of generating a serial data signal while transmitting a serial data signal from the microcontroller 20 of the "slave" meter to the "master" device. In this figure, the first timing chart shows the appearance of the serial data signal as sent directly from the serial port $T_X$ of the microcontroller. This serial data signal is made up of a succession of bits, the beginning of the signal being marked by a start bit of value 1. In the example, the signal has the form "10011101010". The second timing chart shows the signal received at the input of the interface 31, and more precisely at the input of the signal generator 311. Because of the electromagnetic coupling, this signal comprises a sequence of pulses corresponding to each rising or falling front in the serial signal as sent. The third timing chart shows the output from the generator 311, which output corresponds very exactly to the signal "10011101010" as originally sent.

Because firstly software means are used to reconstruct the serial signal in the direction from the "master" device to the "slave" device, and secondly the amplification functions are performed in the "master" device, the costs for the meter are very small.

Figure 9:
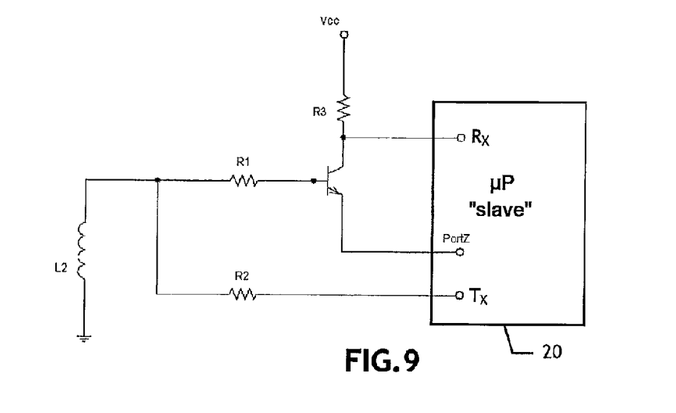
FIG. 9 shows an embodiment of an interface circuit of the "slave" meter for transmission by inductive coupling.

FIG. 9 shows the interface 21 of the meter 2 for inductive type transmission. The coil $L_2$ forming the secondary of the transformer is placed beside the wall 1 of the housing, on the inside of the housing. The other coil $L_1$ is preferably situated on an outside wall of the "master" electronic device. A circuit comprising a bipolar transistor and resistors serves to lower the voltage level required at the input of the microprocessor in order to generate the interrupts.

Figure 10:
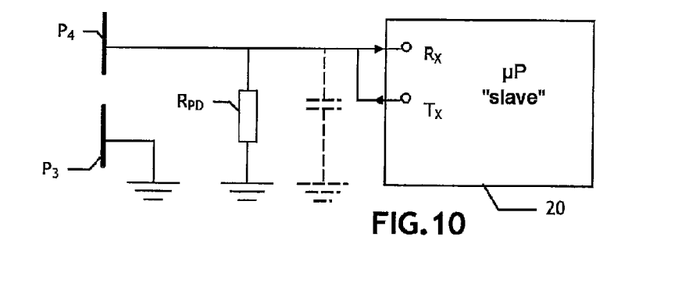
FIG. 10 shows an embodiment of the interface circuit of the "slave" meter for transmission by capacitive coupling.

FIG. 10 shows the interface 21 of the meter 2 for capacitive type transmission. The two plates $P_3$ and $P_4$ may be carried directly by the printed circuit card level with the wall 1 of the housing on the inside of the housing, the plate $P_3$ being connected to ground and the plate $P_4$ being connected to the input and output ports $R_X$ and $T_X$ of the microcontroller 20. Only one pull-down resistor $R_{PD}$ is required in this circuit. The other two plates $P_1$ and $P_2$ may also be carried by the wall 1 of the housing 1, on the outside of the housing. In a variant, these plates $P_1$ and $P_2$ are carried on an outside wall of the "master" electronic device.

The transmission system of the invention is compatible with any two-wire serial communication protocol. The interface 31 of the "master" device does not perform any protocol conversion, but merely acts in one transmission direction to convert fronts into pulses, and in the other transmission direction to convert pulses into levels. The microcontroller 20 uses the same communications software as that which is used for wired transmission, except insofar as software is added upstream in order to manage the interrupts.

The invention claimed is:

1. A bidirectional wireless transmission system for serial format data signals between a "master" first electronic device and a "slave" second electronic device, the serial format data signals being exchanged at short range via a bidirectional electromagnetic coupling means outputting a pulse on each rising or falling front in said serial format data signals, wherein the "slave" second electronic device is an energy meter including a microcontroller having a serial input port, in that in order to transmit data signals from the "master" electronic device to the "slave" energy meter, the pulses output by the electromagnetic coupling means are positive pulses delivered to said serial input port, and in that the microcontroller is programmed to:
generate an interrupt for each pulse received on said input port;
synchronize itself on the first received pulse; and
act at the serial data transmission speed to generate a succession of bits, a value of each generated bit being:
  equal to a value of a preceding bit if no interrupt has been received in the meanwhile; and equal to an inverse of the value of the preceding bit if an interrupt has been received in the meanwhile.

2. A transmission system according to claim 1, wherein the "master" electronic device includes an interface interposed between a serial format data signal sent/receive means and said electromagnetic coupling means, and in that, to transmit data signals from the "master" first electronic device to the "slave" second electronic device, said interface comprises a high-voltage pulse generator receiving the serial format data signals as sent by the send/receive means and outputting a high-voltage pulse on each rising or falling front in the received serial format data signals.

3. A transmission system according to claim 2, wherein to transmit data signals from the "slave" second electronic device to the "master" first electronic device, the serial format data signal for transmission is delivered by an output port of the microcontroller to the electromagnetic coupling means, and wherein said interface comprises a serial signal generator having its input coupled to an output of the electromagnetic coupling means and having its output delivering serial format data signals to said send/receive means.

4. A transmission system according to claim 1, wherein the electromagnetic coupling means are of the inductive type.

5. A transmission system according to claim 4, wherein the electromagnetic coupling means comprise coils placed on either side of a plastic wall of a housing of the meter so as to constitute an electrical transformer.

6. A transmission system according to claim 1, wherein the electromagnetic coupling means are of the capacitive type.

7. A transmission system according to claim 6, wherein the electromagnetic coupling means comprise conductive plates placed on either side of a plastic wall of a housing of the meter so as to act in pairs to form transmission capacitors.

8. A method for use in a microcontroller of an energy meter having a serial port, wherein the energy meter is a slave device to a master device in a bidirectional wireless transmission system for serial format data signals exchanged at short range via bidirectional electromagnetic coupling outputting a pulse on each rising or falling front in the serial format data signals, wherein to transmit data signals from the master electronic device to the slave energy meter the pulses output by the electromagnetic coupling are positive pulses delivered to the serial input port, the method comprising:
 generating an interrupt for each pulse received on the input port;
 synchronizing the microcontroller on the first received pulse; and
 performing operations of the microcontroller at the serial data transmission speed to generate a succession of bits, a value of each generated bit being:
  equal to a value of a preceding bit if no interrupt has been received in the meanwhile; and
  equal to an inverse of the value of the preceding bit if an interrupt has been received in the meanwhile.

9. A method according to claim 8, wherein:
 the master electronic device includes an interface interposed between a serial format communicator and the electromagnetic coupling: and
 to transmit data signals from the master electronic device to the energy meter, the interface comprises a high-voltage pulse generator to receive the serial format data signals as sent by the communicator and to output a high-voltage pulse on each rising or falling front in the received serial format data signals.

10. A method according to claim 9, further comprising delivering, via an output port of the microcontroller, the serial format data signal for transmission to the electromagnetic coupling, wherein the interface comprises a serial signal generator having:
 an input coupled to an output of the electromagnetic coupling; and
 an output to deliver serial format data signals to the communicator.

11. A method according to claim 8, wherein the electromagnetic coupling is inductive.

12. A method according to claim 11, wherein the electromagnetic coupling comprise coils placed on either side of a plastic wall of a housing of the meter to form an electrical transformer.

13. A method according to claim 8, wherein the electromagnetic coupling is capacitive.

14. A method according to claim 13, wherein the electromagnetic coupling comprises conductive plates placed on either side of a plastic wall of a housing of the meter to form paired transmission capacitors.

15. A tangible machine readable storage device comprising instructions that, when executed, cause a microcontroller of an energy meter having a serial port to perform operations, wherein the energy meter is a slave device to a master device in a bidirectional wireless transmission system for serial format data signals exchanged at short range via bidirectional electromagnetic coupling outputting a pulse on each rising or falling front in the serial format data signals, wherein to transmit data signals from the master electronic device to the slave energy meter the pulses output by the electromagnetic coupling are positive pulses delivered to the serial input port, the operations comprising:
 generating an interrupt for each pulse received on the input port;
 synchronizing the microcontroller on the first received pulse; and
 acting at the serial data transmission speed to generate a succession of bits, a value of each generated bit being:
  equal to a value of a preceding bit if no interrupt has been received in the meanwhile; and
  equal to an inverse of the value of the preceding bit if an interrupt has been received in the meanwhile.

16. A storage device according to claim 15, wherein:
 the master electronic device includes an interface interposed between a serial format data signal communicator and the electromagnetic coupling: and
 to transmit data signals from the master electronic device to the energy meter, the interface comprises a high-voltage pulse generator to receive the serial format data signals as sent by the communicator and to output a high-voltage pulse on each rising or falling front in the received serial format data signals.

17. A storage device according to claim 16, wherein the operations further comprise delivering, via an output port of the microcontroller, the serial format data signal for transmission to the electromagnetic coupling, wherein the interface comprises a serial signal generator having:
 an input coupled to an output of the coupling; and
 an output to deliver serial format data signals to the communicator.

18. A storage device according to claim 15, wherein the electromagnetic coupling is inductive.

19. A storage device according to claim 18, wherein the electromagnetic coupling comprise two coils placed on either side of a plastic wall of a housing of the meter to form an electrical transformer.

20. A storage device according to claim 15, wherein the electromagnetic coupling is capacitive and comprises four conductive plates placed on either side of a plastic wall of a housing of the meter to form paired transmission capacitors.

* * * * *